United States Patent
Nishimoto (10) Patent No.: US 8,811,821 B2
(45) Date of Patent: Aug. 19, 2014

(54) OPTICAL TRANSMITTER, OPTICAL TRANSMISSION METHOD, AND TRANSMISSION/RECEPTION SYSTEM

(75) Inventor: Hiroshi Nishimoto, Sagamihara (JP)

(73) Assignee: Fujitsu Optical Components Limited, Kawasaki (JP)

(*) Notice: Subject to any disclaimer, the term of this patent is extended or adjusted under 35 U.S.C. 154(b) by 88 days.

(21) Appl. No.: 13/585,093

(22) Filed: Aug. 14, 2012

(65) Prior Publication Data

US 2013/0101296 A1    Apr. 25, 2013

(30) Foreign Application Priority Data

Oct. 21, 2011 (JP) ................... 2011-232130

(51) Int. Cl.
*H04B 10/04* (2006.01)
*H04B 10/50* (2013.01)
*H04B 10/588* (2013.01)

(52) U.S. Cl.
CPC ........ *H04B 10/50575* (2013.01); *H04B 10/588* (2013.01)
USPC ............... 398/79; 398/38; 398/183; 398/260; 398/186; 398/198; 398/43; 375/260

(58) Field of Classification Search
USPC .................. 398/186, 260, 38, 43; 375/260
See application file for complete search history.

(56) References Cited

U.S. PATENT DOCUMENTS

| | | | | |
|---|---|---|---|---|
| 5,926,297 | A | * | 7/1999 | Ishikawa et al. ................ 398/43 |
| 2004/0161249 | A1 | * | 8/2004 | Suda et al. .................... 398/198 |
| 2008/0080872 | A1 | * | 4/2008 | Tanaka et al. ................. 398/186 |
| 2009/0092192 | A1 | * | 4/2009 | Erving et al. ................. 375/260 |
| 2009/0324252 | A1 | * | 12/2009 | Nagayama et al. ........... 398/183 |
| 2011/0013907 | A1 | * | 1/2011 | Sugihara et al. .............. 398/38 |

FOREIGN PATENT DOCUMENTS

| | | |
|---|---|---|
| EP | 1 739 864 A2 | 1/2007 |
| JP | 2008-92172 | 4/2008 |

OTHER PUBLICATIONS

Extended European Search Report mailed Feb. 6, 2013, issued in corresponding European Patent Application No. 12181328.1.

* cited by examiner

*Primary Examiner* — David Payne
*Assistant Examiner* — Omar S Ismail
(74) *Attorney, Agent, or Firm* — Staas & Halsey LLP (57) ABSTRACT

An optical transmitter includes: a selection circuit; a signal processing circuit; an optical modulator; and a control circuit. The selection circuit selects signal components on the sides of the maximum and minimum values in a multivalued electrical signal for modulation of a transmitting signal. The signal processing circuit generates a multivalued electrical signal into which the transmitting signal is converted by a combination of a superimposed signal that a low-frequency wave is superimposed on the signal components and a signal having a plurality of intermediate amplitude values on which the low-frequency wave is not superimposed. The optical modulator modulates a carrier light on the basis of the multivalued electrical signal. The control circuit controls the reference amplitude value or amplitude of the multivalued electrical signal on the basis of the low-frequency components contained in a modulated optical signal.

9 Claims, 6 Drawing Sheets

OPTICAL TRANSMITTER, OPTICAL TRANSMISSION METHOD, AND TRANSMISSION/RECEPTION SYSTEM

CROSS-REFERENCE TO RELATED APPLICATION

This application is based upon and claims the benefit of priority of the prior Japanese Patent Application No. 2011-232130, filed on Oct. 21, 2011, the entire contents of which are incorporated herein by reference.

FIELD

The embodiments discussed herein are directed to an optical transmitter, an optical transmission method, and an optical transmission/reception system.

BACKGROUND

In recent years, sending and receiving of a high-quality moving image has become popular with the spread of the Internet, and as a result, a volume of information circulating on a communication network gets larger, resulting in a surge in communication traffic.

To cope with such a surge in communication traffic, there has been introduced a transmission system applying a modulation/demodulation method such as differential phase shift keying (DPSK) with a transmission capacity of 40 Gb/s per wavelength in a trunk line. The DPSK is application of PSK that assigns different values to waves which differ in phase from a reference sinusoidal wave thereby transmitting/receiving a signal, and is a technique to detect a phase of a wave on the basis of a phase of the last wave (one-bit preceding wave) transmitted so that a phase can be identified even in the absence of a reference signal.

Furthermore, besides the DPSK, modulation/demodulation methods such as differential quadrature phase shift keying (DQPSK) and dual polarization quadrature phase shift keying (DP-QPSK) are also applied. The DQPSK is application of QPSK that assigns 2-bit data to four modulated phases, respectively, and detects a phase of a carrier wave using a difference from the last carrier wave. The DP-QPSK is a technique to transmit a QPSK signal through two polarized waves. Moreover, at present, DP-QPSK with a higher capacity of 100 Gb/s was standardized by the Optical Internetworking Forum (OIF) and has been developed.

Furthermore, to cope with the surge in communication traffic, there has advanced study of a higher-capacity optical transmission system by the use of an optical modulator applying multi-level optical modulation, such as optical 16 quadrature amplitude modulation (QAM). The QAM is due to a combination of amplitude modulation and phase modulation, and is a modulation/demodulation method for transmitting multiple pieces of information at a time by varying both elements: amplitude and a phase.

The optical modulator modulates, for example, a carrier light emitted from a laser diode (LD) on the basis of a drive signal based on a transmitting signal, thereby generating a modulated optical signal. Here, if the amplitude of the drive signal for driving the optical modulator deviates from appropriate amplitude, distortion of constellation occurs, and this causes signal-noise (S/N) ratio degradation of the modulated optical signal. Therefore, control of drive amplitude so as to be an optimum value is required.

In this regard, in conventional technologies, there is a known technology to control amplitude of a drive signal to be the optimum amplitude in an optical modulator applying DQPSK modulation in such a manner that the optical modulator modulates the drive signal by varying the amplitude minutely with a low-frequency wave and controls the amplitude of the drive signal so that the low-frequency component contained in a modulated optical signal is zero. This takes advantage of characteristics of the optical modulator applying DQPSK modulation—that is, the low-frequency component is contained in a modulated optical signal when the amplitude of the drive signal deviates from an appropriate value; on the other hand, the low-frequency component is not contained in a modulated optical signal when the amplitude of the drive signal is the appropriate value.

Patent document 1: Japanese Laid-open Patent Publication No. 2008-092172

However, the conventional technology does not take into account the control of amplitude of a drive signal appropriately in more multi-level optical modulation, such as 16QAM optical modulation.

Namely, for example, DQPSK modulation is achieved by combining phase modulation of two values which differ in phase by $\pi$, such as $0/\pi$. Consequently, when amplitude of a drive signal is an appropriate value, a low-frequency component superimposed on the drive signal in the phase of $0/\pi$ is output as a frequency component of a frequency twice as high as the low-frequency component, so no low-frequency component is contained in a modulated optical signal. Therefore, by controlling amplitude of a drive signal so that a low-frequency component contained in a modulated optical signal is zero, the amplitude of the drive signal can be controlled to be the optimum amplitude.

On the other hand, more multi-level optical modulation, such as 16QAM optical modulation, is achieved by combining phase modulation in a phase of $0<\phi<\pi$ in addition to $0/\pi$. When the conventional technology is directly applied to such an optical modulation, even if amplitude of a drive signal is the appropriate value, a low-frequency component superimposed on the drive signal is output as a frequency component as-is in the phase of $0<\phi<\pi$, so the low-frequency component is contained in a modulated optical signal. Namely, regardless of whether the amplitude of the drive signal is optimum, the low-frequency component is contained in the modulated optical signal; therefore, it is difficult to determine whether the amplitude of the drive signal is optimum. If the amplitude of the drive signal is controlled so that the low-frequency component contained in the modulated optical signal is zero, it may be difficult to control the amplitude of the drive signal to be the optimum amplitude.

SUMMARY

According to an aspect of the embodiments, an optical transmitter includes: a selection circuit that selects signal components on the sides of the maximum and minimum values in a multivalued electrical signal for modulation of a transmitting signal as a low-frequency superimposed part, the multivalued electrical signal having three or more values; a signal processing circuit that generates a multivalued electrical signal into which the transmitting signal is converted by a combination of a superimposed signal that a low-frequency wave is superimposed on the signal components and a signal having a plurality of intermediate amplitude values on which the low-frequency wave is not superimposed; an optical modulator that modulates a carrier light on the basis of the multivalued electrical signal generated by the signal processing circuit; and an amplitude control circuit that controls the reference amplitude value or amplitude of the multivalued electrical signal on the basis of the low-frequency components contained in a modulated optical signal modulated by the optical modulator.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. Incidentally, the present invention is not limited to the embodiments.

Figure 1:
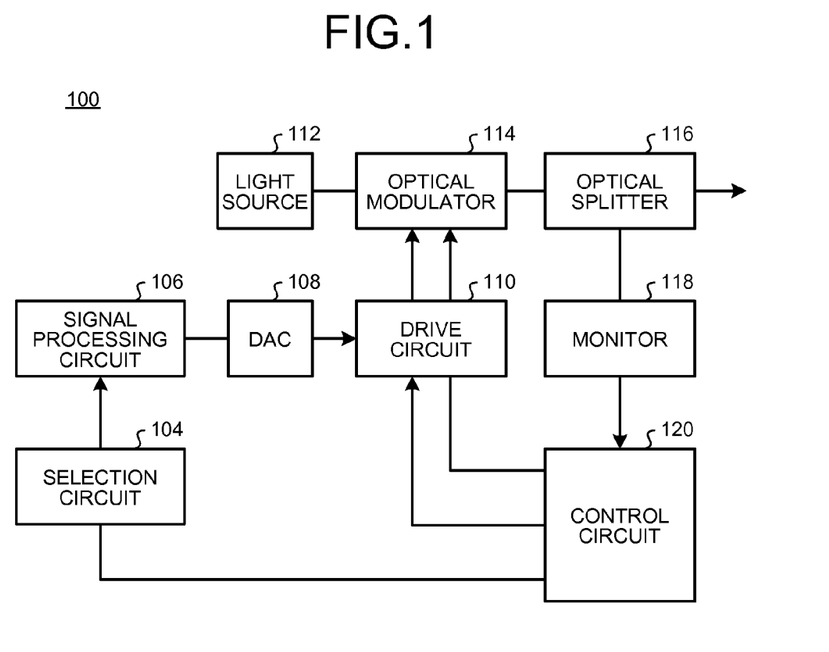
FIG. 1 is a functional block diagram of an optical transmitter.

In the embodiments below, first, a functional block diagram of the optical transmitter and an outline of a low-frequency superimposing process are explained, and then, a more concrete configuration and processing contents of the optical transmitter are explained. FIG. 1 is the functional block diagram of the optical transmitter. As illustrated in FIG. 1, an optical transmitter 100 includes a selection circuit 104, a signal processing circuit 106, a digital-to-analog converter (DAC) 108, and a drive circuit 110. Furthermore, the optical transmitter 100 includes a light source 112, an optical modulator 114, an optical splitter 116, a monitor 118, and a control circuit 120.

An electrical signal to be transmitted is input to the signal processing circuit 106.

The selection circuit 104 selects signal components on the side of the maximum and minimum values in a multivalued electrical signal for modulation of a transmitting signal as a superimposed part. For example, the selection circuit 104 selects only a maximum-voltage signal component or minimum-voltage signal component of the multivalued electrical signal from a reference amplitude value (A) as a low-frequency superimposed part. The selection circuit 104 outputs the selected low-frequency superimposed part to the signal processing circuit 106. Detailed processing by the selection circuit 104 will be described later.

The signal processing circuit 106 generates a low-frequency superimposed signal that a low-frequency wave is superimposed on the signal component selected by the selection circuit 104. Furthermore, the signal processing circuit 106 generates a plurality of intermediate amplitude signals of a plurality of successive intermediate amplitude values which are obtained by multiplying the reference amplitude value (A) by a plurality of preset ratios, respectively. Then, the signal processing circuit 106 generates multivalued electrical signal information that a transmitting signal is modulated by a combination of the low-frequency superimposed signal and the intermediate amplitude signals. The signal processing circuit 106 outputs the generated multivalued electrical signal information to the DAC 108. Detailed processing by the signal processing circuit 106 will be described later.

The DAC 108 converts a digital signal of the multivalued electrical signal information output from the signal processing circuit 106 into an analog signal, and outputs the analog signal to the drive circuit 110. The drive circuit 110 amplifies the analog multivalued electrical signal received from the DAC 108, and generates a drive signal. The drive circuit 110 outputs the generated drive signal to the optical modulator 114.

The light source 112 is, for example, an LD or the like, and outputs a carrier light. The optical modulator 114 modulates the carrier light on the basis of the drive signal output from the drive circuit 110. The optical modulator 114 outputs a modulated optical signal to the optical splitter 116.

The optical splitter 116 splits the modulated optical signal output from the optical modulator 114 into two, and diverges a part of the modulated optical signal to the monitor 118.

The monitor 118 is a processing circuit for monitoring the part of the modulated optical signal split by the optical splitter 116, and includes, for example, a band-pass filter or low-pass filter through which a low-frequency component superimposed in the signal processing circuit 106 passes. The monitor 118 outputs a signal containing the low-frequency component passing through the band-pass filter or low-pass filter to the control circuit 120.

The control circuit 120 controls amplitude of the reference amplitude value (A) or amplitude of the multivalued electrical signal in the drive circuit 110 on the basis of a phase and intensity of the low-frequency component contained in the signal output from the monitor 118. For example, the control circuit 120 controls the amplitude of the reference amplitude value (A) or the amplitude of the multivalued electrical signal in the drive circuit 110 so that the intensity of the low-frequency component contained in the signal output from the monitor 118 is minimum (zero). The control circuit 120 outputs, for example, a control signal for controlling the amplitude of the reference amplitude value (A) to the selection circuit 104, or outputs a control signal for controlling the amplitude of the multivalued electrical signal to the drive circuit 110.

Furthermore, the control circuit 120 generates a low-frequency wave used in generation of a low-frequency superimposed signal by the signal processing circuit 106, and outputs the generated low-frequency wave to the signal processing circuit 106 via the selection circuit 104. The low-frequency wave is, for example, a square wave having the sufficiently smaller amplitude than the reference amplitude value (A) and a low-frequency (for example, a frequency of 1 KHz) component to be superimposed in the signal processing circuit 106. The low-frequency wave is not limited to such a square wave, and can be a sinusoidal wave or triangular wave, etc. having the sufficiently smaller amplitude than the reference amplitude value (A) and a low-frequency component to be superimposed in the signal processing circuit 106. Moreover, the control circuit 120 generates a control signal for controlling the bias voltage used in modulation of a carrier light by the optical modulator 114, and outputs the generated control signal to the optical modulator 114.

Figure 2:
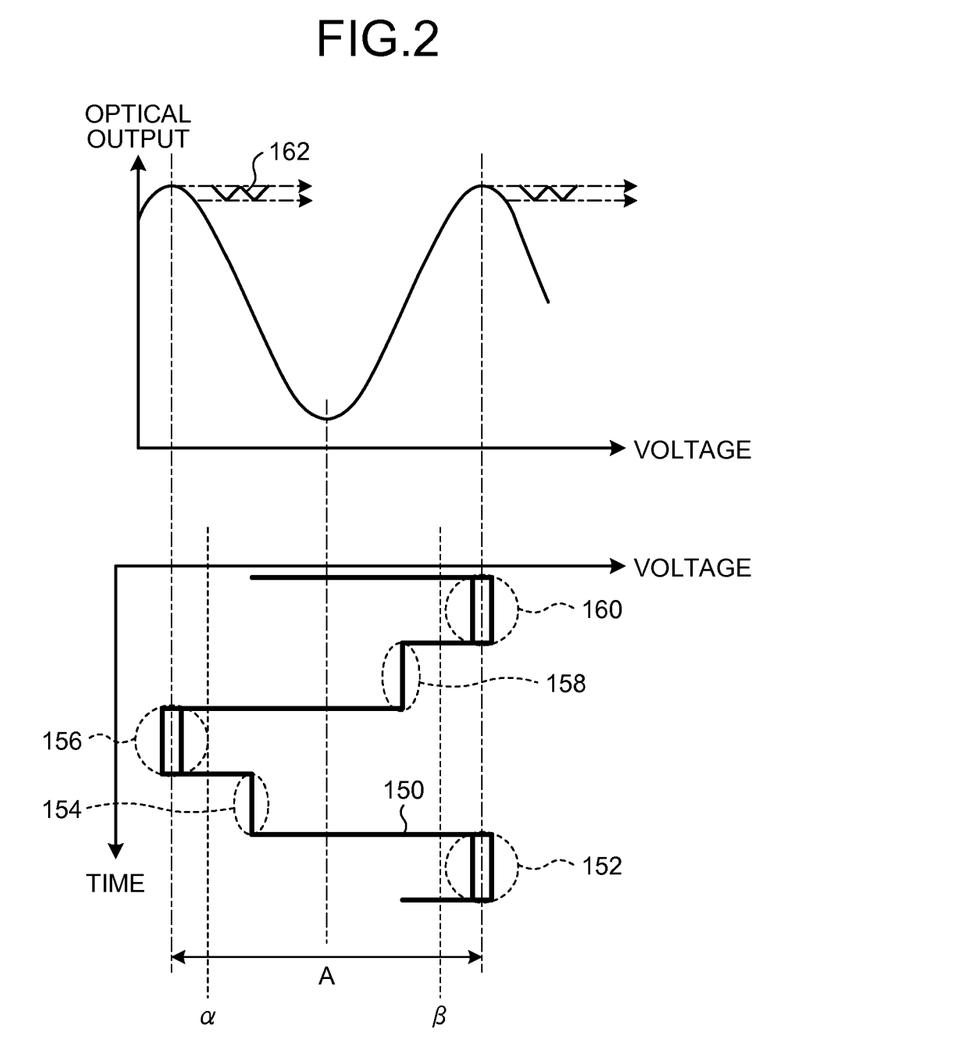
FIG. 2 is a diagram illustrating an outline of a low-frequency superimposing process.

Subsequently, the outline of the low-frequency superimposing process is explained. FIG. 2 is a diagram illustrating the outline of the low-frequency superimposing process. A graph in the upper part of FIG. 2 is a graph indicating a property of optical intensity with respect to a drive voltage of the optical modulator 114; the horizontal axis of the graph indicates a drive voltage of the optical modulator 114, and the vertical axis indicates optical output intensity with respect to the drive voltage. Furthermore, a graph in the lower part of FIG. 2 schematically indicates a waveform of a multivalued electrical signal 150 for driving the optical modulator 114; the horizontal axis of the graph indicates a drive voltage of the optical modulator 114, and the vertical axis indicates the time course. In FIG. 2, the reference amplitude value (A) is a voltage corresponding to a voltage between peaks of an optical output characteristic, and FIG. 2 illustrates a state where the amplitude of a drive signal is controlled optimally.

As illustrated in FIG. 2, in a drive signal (a multivalued electrical signal) for driving the optical modulator 114, a square low-frequency wave of, for example, a frequency of 1 KHz is superimposed on a maximum-voltage signal component 156 and minimum-voltage signal components 152 and 160 based on the reference amplitude value (A) set for modulation of a transmitting signal. The low-frequency wave is not superimposed on intermediate amplitude components 154 and 158, which are obtained by multiplying the reference amplitude value (A) by preset ratios respectively, of the drive signal (the multivalued electrical signal), and the intermediate amplitudes obtained by multiplying the reference amplitude value (A) by the preset ratios continue. Incidentally, low-frequency waves which are opposite in phase are superimposed on the maximum-voltage signal component 156 and the minimum-voltage signal components 152 and 160, respectively.

By generating such a drive signal, it can be distinguished whether or not the amplitude of the drive signal is controlled optimally, because a low-frequency component by the low-frequency wave is not contained in a modulated optical signal when the amplitude of the drive signal is controlled optimally; the low-frequency component is contained in a modulated optical signal when the amplitude of the drive signal is not controlled optimally. Namely, when the amplitude of the drive signal is controlled optimally, the optical modulator 114 is driven by the low-frequency wave superimposed on the maximum-voltage signal component 156 and the minimum-voltage signal components 152 and 160 of the reference amplitude value (A), in a part the optical output characteristic straddles the peaks. As a result, a modulated optical signal 162 having a frequency component of a frequency twice as high as the low-frequency component superimposed on the drive signal is output from the optical modulator 114.

On the other hand, the case where the amplitude of the drive signal is not controlled optimally, for example, due to an increase or decrease in the reference amplitude value (A) from that is illustrated in FIG. 2 will be considered. In this case, the low-frequency wave superimposed on the maximum-voltage signal component 156 and the minimum-voltage signal components 152 and 160 based on the reference amplitude value (A) drives the optical modulator 114 in the part where the optical output characteristic is increased or decreased. As a result, a modulated optical signal having low-frequency components superimposed on the maximum-voltage signal component 156 and the minimum-voltage signal components 152 and 160 based on the reference amplitude value (A) is output from the optical modulator 114. Therefore, if a modulated optical signal output from the optical modulator 114 contains a low-frequency component superimposed on the drive signal, it can be seen that the reference amplitude value (A) is not controlled appropriately. In other words, the amplitude of the drive signal can be controlled optimally by adaptively controlling the amplitude of the drive signal so that a low-frequency component contained in a modulated optical signal output from the optical modulator 114 is minimum (zero). Furthermore, by controlling the amplitude of the drive signal optimally, the modulated optical signal output from the optical modulator 114 can be prevented from deteriorating in quality. Incidentally, by controlling the amplitude of the drive signal optimally, the intermediate amplitudes obtained by multiplying the reference amplitude value (A) by certain ratios are also controlled appropriately.

As illustrated in FIG. 2, in the present embodiment, the low-frequency wave is superimposed on only the maximum-voltage signal component 156 and the minimum-voltage signal components 152 and 160 based on the reference amplitude value (A), and no low-frequency wave is superimposed on the intermediate amplitude components 154 and 158. This is because if a low-frequency wave is superimposed on the intermediate amplitude components 154 and 158, it will be hard to control the amplitude of the drive signal appropriately.

Namely, for example, if a low-frequency component is also superimposed on the intermediate amplitude components 154 and 158, the low-frequency component superimposed on the intermediate amplitude components 154 and 158 drives the optical modulator 114 in the part where the optical output characteristic is increased or decreased. As a result, the optical modulator 114 outputs a modulated optical signal having the low-frequency component superimposed on the drive signal. That is, the low-frequency component is contained in the modulated optical signal regardless of whether the amplitude of the drive signal is in an appropriate state; therefore, it is hard to determine whether the amplitude of the drive signal is appropriate. Even if the amplitude of the drive signal is adaptively controlled so that the low-frequency component contained in the modulated optical signal is minimum (zero), it may be difficult to control the amplitude of the drive signal appropriately.

However, in FIG. 2, the low-frequency wave is superimposed on only the maximum-voltage signal component 156 and the minimum-voltage signal components 152 and 160 based on the reference amplitude value (A); therefore, as described above, it is possible to distinguish whether the amplitude of the drive signal is appropriate or not. As a result, the amplitude of the drive signal can be controlled optimally by adaptively controlling the amplitude of the drive signal so that a low-frequency component contained in a modulated optical signal output from the optical modulator 114 is minimum (zero).

Incidentally, in FIG. 2, there is illustrated the example where the low-frequency wave is superimposed on only the maximum-voltage signal component 156 and the minimum-voltage signal components 152 and 160 based on the reference amplitude value (A); however, it is not limited to this. For example, as illustrated in FIG. 2, the low-frequency wave can be superimposed on only a signal component of a voltage lower than a preset first threshold ($\alpha$) of the reference amplitude value (A) or a signal component of a voltage higher than a preset second threshold ($\beta$) higher than the first threshold ($\alpha$).

Here, the first threshold ($\alpha$) is set to be lower than the minimum voltage value in the plurality of intermediate amplitude components 154 and 158 (a voltage of the intermediate amplitude component 154) and higher than the minimum voltage value of the reference amplitude value (A). Furthermore, the second threshold ($\beta$) is set to be higher than the maximum voltage value in the plurality of intermediate amplitude components 154 and 158 (a voltage of the intermediate amplitude component 158) and lower than the maximum voltage value of the reference amplitude value (A).

[a] First Embodiment

Figure 3:
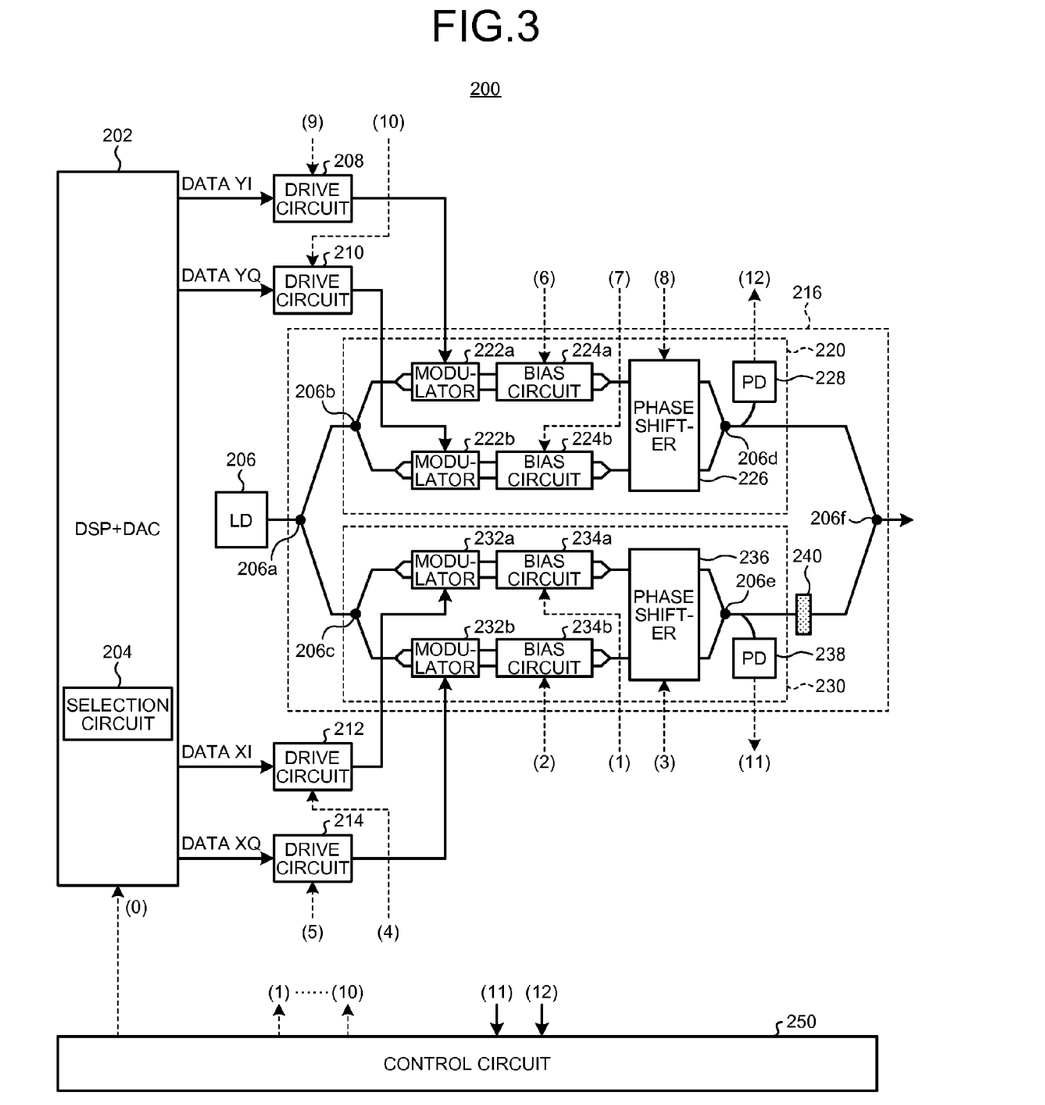
FIG. 3 is a block diagram illustrating a configuration of an optical transmitter according to a first embodiment.

Subsequently, a configuration of an optical transmitter according to a first embodiment is explained. FIG. 3 is a block diagram illustrating the configuration of the optical transmitter according to the first embodiment. As illustrated in FIG. 3, an optical transmitter 200 includes a digital signal processor (DSP)+DAC 202, an LD 206, drive circuits 208, 210, 212, and 214, a DP-I/Q_LN (LiNbO$_3$: lithium niobate) modulator 216, and a control circuit 250.

The control circuit 250 is a circuit corresponding to the control circuit 120 illustrated in FIG. 1. The control circuit 250 outputs respective control signals (0 to 10) for controlling the circuits on the basis of detection signals (11, 12) output from a photo diode (PD) 228 of a Y-side modulator 220 to be described later and a PD 238 of an X-side modulator 230 to be described later. Details of the control circuit 250 will be described later.

The DSP+DAC 202 is a large-scale integration (LSI) circuit into which the functions of the signal processing circuit 106 and the DAC 108 illustrated in FIG. 1 are integrated. The DSP+DAC 202 includes a selection circuit 204 corresponding to the selection circuit 104 illustrated in FIG. 1. The DSP+DAC 202 can recognize a maximum amplitude part (maximum and minimum voltage parts) of a multivalued electrical signal in the DSP section, and can generate a signal that only the maximum amplitude part of the multivalued electrical signal is subjected to low-frequency modulation in the DAC section. Furthermore, an intermediate amplitude signal of the multivalued electrical signal can be set to be in a certain ratio to the maximum amplitude in the DAC and not to be subjected to low-frequency modulation.

DATA YI output from the DSP+DAC 202 is input to the drive circuit 208. The DATA YI is, for example, a four-valued electrical signal as illustrated in FIG. 2. The DSP+DAC 202 superimposes a low-frequency wave on only maximum and minimum voltage parts of the four-valued electrical signal as illustrated in FIG. 2. The drive circuit 208 controls, for example, amplitude of the DATA YI on the basis of the control signal (9) output from the control circuit 250 and then outputs the DATA YI.

DATA YQ output from the DSP+DAC 202 is input to the drive circuit 210. The DATA YQ is, for example, a four-valued electrical signal as illustrated in FIG. 2. The DSP+DAC 202 superimposes a low-frequency wave on only maximum and minimum voltage parts of the four-valued electrical signal as illustrated in FIG. 2. The drive circuit 210 controls, for example, amplitude of the DATA YQ on the basis of the control signal (10) output from the control circuit 250 and then outputs the DATA YQ.

DATA XI output from the DSP+DAC 202 is input to the drive circuit 212. The DATA XI is, for example, a four-valued electrical signal as illustrated in FIG. 2. The DSP+DAC 202 superimposes a low-frequency wave on only maximum and minimum voltage parts of the four-valued electrical signal as illustrated in FIG. 2. The drive circuit 212 controls, for example, amplitude of the DATA XI on the basis of the control signal (4) output from the control circuit 250 and then outputs the DATA XI.

DATA XQ output from the DSP+DAC 202 is input to the drive circuit 214. The DATA XQ is, for example, a four-valued electrical signal as illustrated in FIG. 2. The DSP+DAC 202 superimposes a low-frequency wave on only maximum and minimum voltage parts of the four-valued electrical signal as illustrated in FIG. 2. The drive circuit 214 controls, for example, amplitude of the DATA XQ on the basis of the control signal (5) output from the control circuit 250 and then outputs the DATA XQ.

The LD 206 is a laser diode corresponding to the light source 112 illustrated in FIG. 1. A carrier light output from the LD 206 is split into two by an optical splitter 206a, and one of the carrier lights is further split into two by an optical splitter 206b, and the other carrier light is further split into two by an optical splitter 206c.

The DP-I/Q_LN modulator 216 includes the Y-side modulator 220, the X-side modulator 230, and a π/2 polarization rotator 240. The Y-side modulator 220 and the X-side modulator 230 can be a 16QAM optical modulator. The π/2 polarization rotator 240 polarizes a modulated optical signal output from the X-side modulator 230.

The Y-side modulator 220 includes modulators 222a and 222b, bias circuits 224a and 224b, a phase shifter 226, and the photo diode (PD) 228. The modulators 222a and 222b can be, for example, a Mach_Zender modulator.

The modulator 222a modulates one of the carrier lights split by the optical splitter 206b in response to a drive signal supplied from the drive circuit 208. The bias circuit 224a controls a phase relationship between two modulated light waves output from the modulator 222a on the basis of the control signal (6) output from the control circuit 250.

The modulator 222b modulates the other carrier light split by the optical splitter 206b in response to a drive signal supplied from the drive circuit 210. The bias circuit 224b controls a phase relationship between two modulated light waves output from the modulator 222b on the basis of the control signal (7) output from the control circuit 250.

The phase shifter 226 relatively shifts phases of light waves of a modulated optical signal output from the bias circuit 224a and a modulated optical signal output from the bias circuit 224b by π/2 on the basis of the control signal (8) output from the control circuit 250. For example, the phase shifter 226 shifts the modulated optical signal output from the bias circuit 224a by π/4, and shifts the modulated optical signal output from the bias circuit 224b by π/4 to the opposite side, thereby relatively shifting the modulated optical signals by π/2. The two modulated optical signals output from the phase shifter 226 are synthesized by an optical coupler 206d.

The PD 228 is a photodetector that detects a modulated optical signal output from the optical coupler 206d and outputs an electrical signal depending on the detected modulated optical signal. The PD 228 outputs the electrical signal depending on the detected modulated optical signal as the detection signal (12) to the control circuit 250.

The X-side modulator 230 includes modulators 232a and 232b, bias circuits 234a and 234b, a phase shifter 236, and the PD 238. The modulators 232a and 232b can be, for example, a Mach_Zender modulator.

The modulator 232a modulates one of the carrier lights split by the optical splitter 206c in response to a drive signal supplied from the drive circuit 212. The bias circuit 234a controls a bias of a modulated optical signal output from the modulator 232a on the basis of the control signal (1) output from the control circuit 250.

The modulator 232b modulates the other carrier light split by the optical splitter 206c in response to a drive signal supplied from the drive circuit 214. The bias circuit 234b controls a bias of a modulated optical signal output from the modulator 232b on the basis of the control signal (2) output from the control circuit 250.

The phase shifter 236 relatively shifts a modulated optical signal output from the bias circuit 234a and a modulated optical signal output from the bias circuit 234b by π/2 on the basis of the control signal (3) output from the control circuit 250. For example, the phase shifter 236 shifts the modulated optical signal output from the bias circuit 234a by π/4, and shifts the modulated optical signal output from the bias circuit 234b by π/4 to the opposite side, thereby relatively shifting the modulated optical signals by π/2. The two modulated optical signals output from the phase shifter 236 are synthesized by an optical coupler 206e.

The PD 238 is a photodetector that detects a modulated optical signal output from the optical coupler 206e and outputs an electrical signal depending on the detected modulated optical signal. The PD 238 outputs the electrical signal depending on the detected modulated optical signal as the detection signal (11) to the control circuit 250.

A modulated optical signal output from the Y-side modulator 220 and a modulated optical signal, which was output from the X-side modulator 230 and polarized by the π/2 polarization rotator 240, are synthesized by an optical coupler 206f and then output from the DP-I/Q_LN modulator 216.

The optical transmitter 200 can have time-sharing control of the four child modulators (the modulators 222a, 222b, 232a, and 232b) so as not to superimpose a low-frequency signal at the same time. Furthermore, the optical transmitter 200 can have time-sharing control of the two child modulators in each polarization (the modulators 222a and 222b or the modulators 232a and 232b) so as not to superimpose a low-frequency signal at the same time. This is because when low-frequency superimposition is performed on the child modulators at the same time, the control circuit 250 cannot distinguish which modulator a modulated optical signal detected by the PD 228 or the PD 238 was output from. However, in the present embodiment, the timing to superimpose the low-frequency wave differs among the four child modulators or the two child modulators in each polarization, so the control circuit 250 can correctly distinguish which modulator a modulated optical signal was output from.

Furthermore, when low-frequency superimposition is performed on the four child modulators or the two child modulators in each polarization at the same time, the optical transmitter 200 can set different frequencies of low-frequency waves to be superimposed in the respective modulators. Accordingly, even if low-frequency superimposition is performed on the four child modulators or the two child modulators in each polarization at the same time, the control circuit 250 can correctly distinguish which modulator a modulated optical signal was output from.

The control circuit 250 distinguishes which modulator a modulated optical signal (a detection signal) output from the PD 228 or the PD 238 was output from, and controls amplitude of a drive signal on the basis of the intensity of a low-frequency component contained in the signal output from the PD 228 or the PD 238. The control circuit 250 controls the amplitude of the drive signal so that the intensity of the low-frequency component contained in the signal output from the PD 228 or the PD 238 is minimum (zero).

For example, the control circuit 250 controls the amplitude of the reference amplitude value (A) used in the DSP+DAC 202 in response to the control signal (0), or controls the degree of amplification in the drive circuits 208, 210, 212, 214 in response to the control signals (4, 5, 9, 10).

Figure 4:
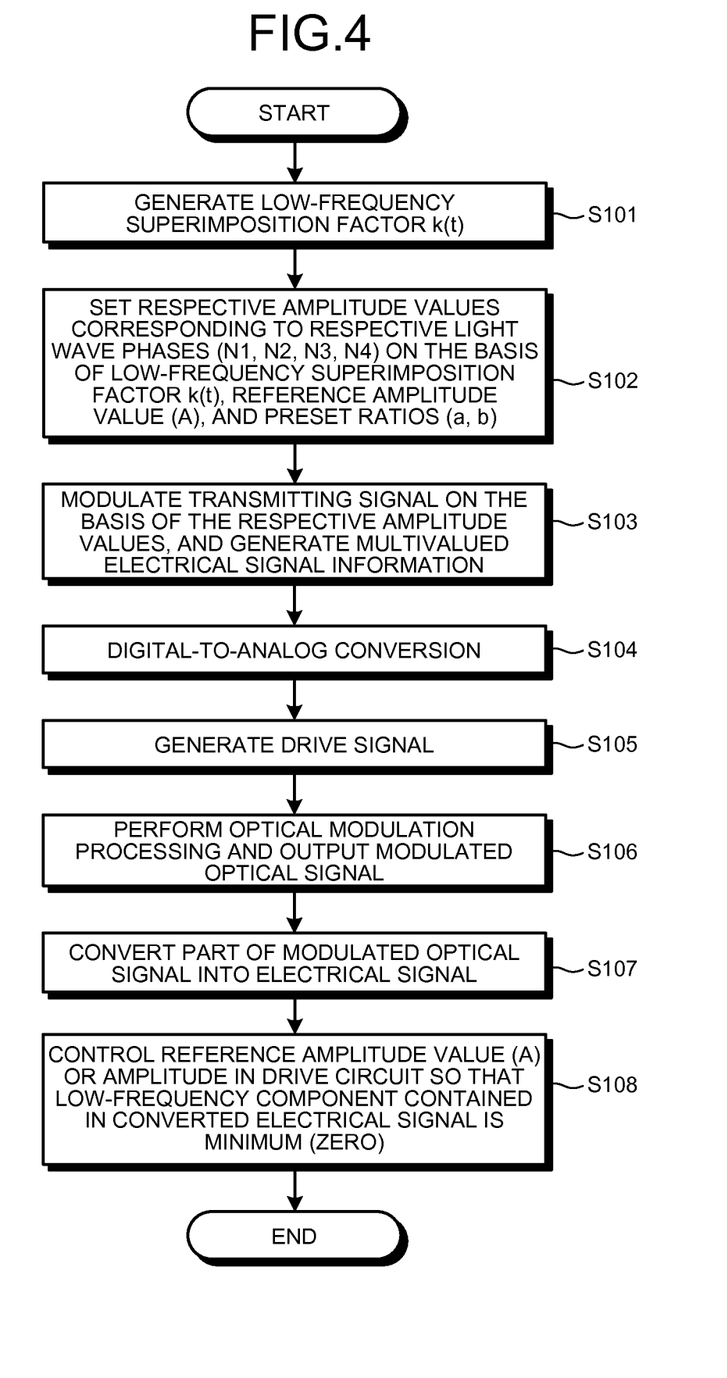
FIG. 4 is a flowchart illustrating processing contents of the optical transmitter.

Subsequently, processing by the optical transmitter 200 is explained. FIG. 4 is a flowchart illustrating processing contents of the optical transmitter. As illustrated in FIG. 4, first, the control circuit 250 generates a low-frequency superimposition factor k(t) (S101). Here, the low-frequency superimposition factor k(t) is, for example, a square wave having the sufficiently smaller amplitude than the reference amplitude value (A) and a low-frequency (for example, a frequency of 1 KHz) component to be superimposed in the DSP+DAC 202. The low-frequency superimposition factor k(t) is not limited to such a square wave, and can be a sinusoidal wave or triangular wave, etc. having the sufficiently smaller amplitude than the reference amplitude value (A) and a low-frequency component to be superimposed in the DSP+DAC 202.

Then, the DSP+DAC 202 determines respective amplitude values corresponding to respective light wave phases (N1, N2, N3, N4) on the basis of the low-frequency superimposition factor k(t), the reference amplitude value (A), and preset ratios (a, b) (S102). For example, the phase N1 corresponds to the maximum-voltage signal component 156 based on the reference amplitude value (A) illustrated in FIG. 2. Furthermore, for example, the phase N2 corresponds to the intermediate amplitude component 154 illustrated in FIG. 2. Moreover, for example, the phase N3 corresponds to the intermediate amplitude component 158 illustrated in FIG. 2. Furthermore, for example, the phase N4 corresponds to the minimum-voltage signal component 152 or 160 based on the reference amplitude value (A) illustrated in FIG. 2.

For example, the DSP+DAC 202 determines the amplitude of the phase N1 by N1=k(t)×A. When the low-frequency superimposition factor k(t) is a square wave, the amplitude of the phase N1 is maximum and minimum voltage parts of the square wave. Furthermore, the DSP+DAC 202 determines the amplitude of the phase N2 by N2=a×A, and determines the amplitude of the phase N3 by N3=b×A. Consequently, the amplitudes of the phases N2 and N3 are each a fixed value. Moreover, the DSP+DAC 202 determines the amplitude of the phase N4 by N4=A(1−k(t)). When the low-frequency superimposition factor k(t) is a square wave, the amplitude of the phase N4 is maximum and minimum voltage parts of the square wave.

Then, the DSP+DAC 202 modulates a transmitting signal on the basis of the respective amplitude values corresponding to the respective light wave phases, and generates digital multivalued electrical signal information (S103). Then, the DSP+DAC 202 converts the digital multivalued electrical signal information into an analog multivalued electrical signal (S104).

Then, the drive circuit 208, 210, 212, 214 generates a drive signal by amplifying the analog multivalued electrical signal (S105). Then, the modulator 222a, 222b, 232a, 232b modulates a carrier light on the basis of the drive signal, and outputs a modulated optical signal (S106).

Then, the PD 228, 238 converts a part of the modulated optical signal into an electrical signal (S107). Then, the control circuit 250 controls the reference amplitude value (A) or the amplitude in the drive circuit 208, 210, 212, 214 so that a low-frequency component contained in the converted electrical signal is minimum (zero) (S108). Incidentally, the processing flow in FIG. 4 is repeated to constantly control the drive amplitude optimally with respect to temperature fluctuation, power-supply voltage fluctuation, temporal variation, and the like.

As described above, according to the optical transmitter 200 in the first embodiment, regardless of a multi-level degree of multi-level optical modulation, the amplitude of an optical-transmitter drive signal can be controlled appropriately. Namely, according to the optical transmitter 200, the low-frequency wave is superimposed on only the maximum-voltage signal component 156 and the minimum-voltage signal components 152 and 160 based on the reference amplitude value (A) in a drive signal (a multivalued electrical signal) for driving the modulators 222a, 222b, 232a, 232b. Then, no low-frequency wave is superimposed on the intermediate amplitude components 154 and 158 of the multivalued electrical signal, and this part of the multivalued electrical signal is a signal having a succession of values obtained by multiplying the reference amplitude value (A) by preset ratios. In other words, the multivalued electrical signal is generated by a combination of a superimposed signal that the low-frequency wave is superimposed on the maximum-voltage signal component 156 and the minimum-voltage signal components 152 and 160 and the intermediate amplitude components 154 and 158 obtained by multiplying the reference amplitude value (A) by the plurality of preset ratios. Consequently, when the amplitude of the drive signal is appropriate, no low-frequency component is contained in a modulated optical signal; when the amplitude of the drive signal is not appropriate, a low-frequency component is contained in a modulated optical signal; therefore, it is possible to distinguish between the two. Namely, by adaptively controlling the amplitude of the drive signal so that a low-frequency component contained in a modulated optical signal output from the optical modulator 114 is minimum (zero), the amplitude of the drive signal can be controlled optimally regardless of a multivalued degree of the multivalued electrical signal. Furthermore, by controlling the amplitude of the drive signal optimally, the intermediate amplitude obtained by multiplying the reference amplitude value (A) by a certain ratio can also be controlled appropriately. As a result, it is possible to prevent deterioration of quality of the modulated optical signal output from the optical transmitter 200.

[b] Second Embodiment

Figure 5:
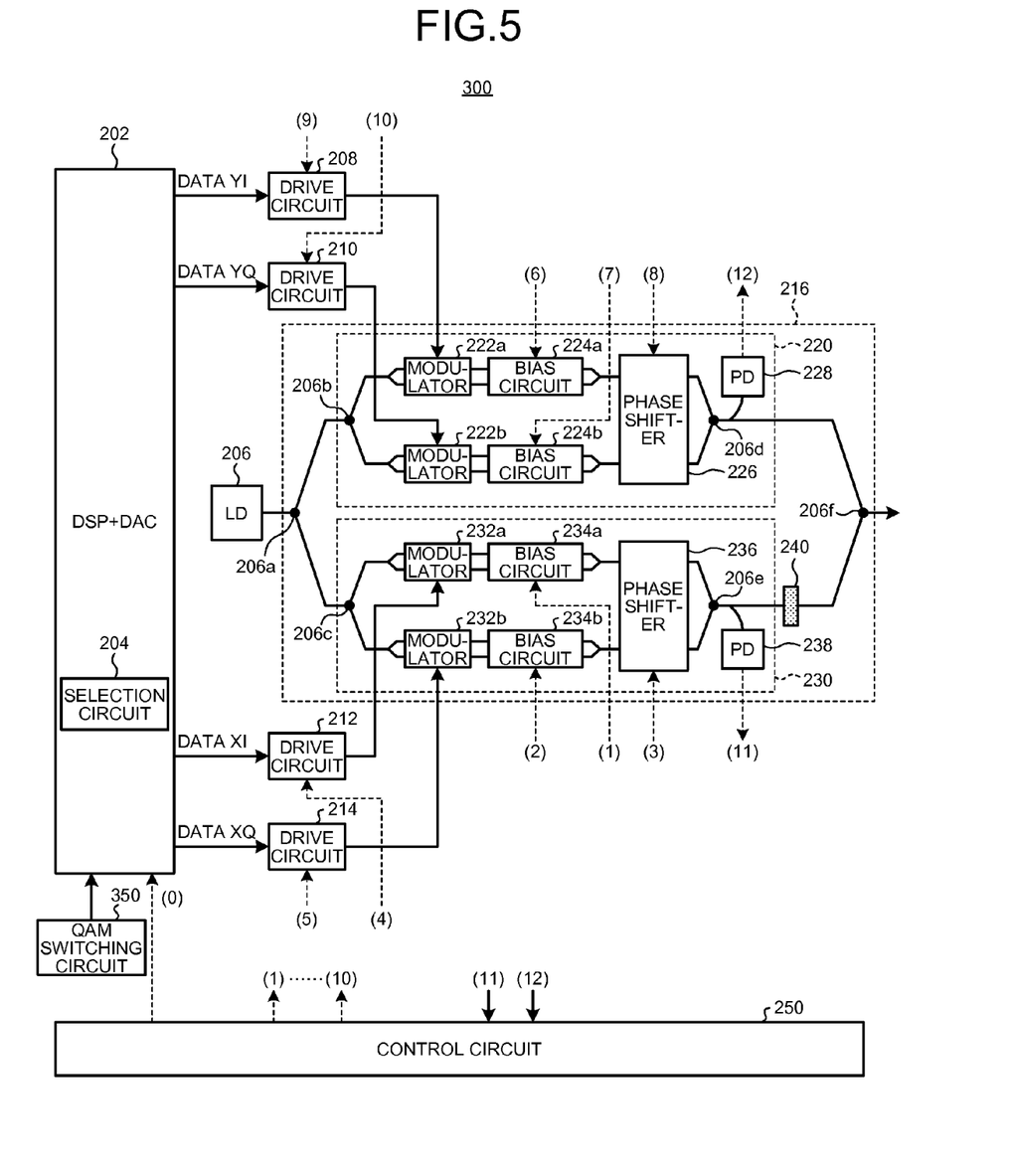
FIG. 5 is a block diagram illustrating a configuration of an optical transmitter according to a second embodiment.

Subsequently, an optical transmitter according to a second embodiment is explained. FIG. 5 is a block diagram illustrating a configuration of the optical transmitter according to the second embodiment. An optical transmitter 300 in the second embodiment has about the same configuration as the optical transmitter 200 in the first embodiment, and further includes a QAM switching circuit 350. Therefore, description of the same configuration as in the first embodiment is omitted, and the following is mainly an explanation about the QAM switching circuit 350.

The QAM switching circuit 350 outputs a switching signal for switching a modulation method to the DSP+DAC 202. For example, the QAM switching circuit 350 outputs a switching signal for switching a multivalued degree of a multivalued electrical signal to be generated in the DSP+DAC 202. The QAM switching circuit 350 outputs a switching signal for switching the modulation method to, for example, 8QAM, 16QAM, 32QAM, 64QAM, . . . , or the like to the DSP+DAC 202.

The DSP+DAC 202 changes a multivalued degree of a multivalued electrical signal in response to the switching signal output from the QAM switching circuit 350. For example, in the first embodiment, the DATA YI, the DATA YQ, the DATA XI, and the DATA XQ are four-valued electrical signals; in the second embodiment, the multivalued degree of the multivalued electrical signal can be variably set in response to a switching signal. For example, when the DATA YI, the DATA YQ, the DATA XI, and the DATA XQ each generate an eight-valued electrical signal, the Y-side modulator 220 and the X-side modulator 230 are 64QAM optical modulators.

In this manner, according to the second embodiment, in addition to the effects described in the first embodiment, it is possible to support a variety of modulation methods. Namely, according to the second embodiment, the modulation method of the optical transmitter 300 can be changed by a switching signal output from the QAM switching circuit 350, so the optical transmitter 300 can support a variety of modulation methods, such as 8QAM, 16QAM, 32QAM, 64QAM, . . . , and the versatility of the optical transmitter 300 is enhanced.

Incidentally, for example, when an eight-valued electrical signal is generated, the DSP+DAC 202 superimposes the low-frequency wave on only the maximum and minimum voltage parts of the eight-valued electrical signal, and the remaining six-valued intermediate amplitude signal has values obtained by multiplying the reference amplitude value (A) by preset certain ratios. Even when the multivalued degree of the multivalued electrical signal is changed in this way, the DSP+DAC 202 superimposes the low-frequency wave on only the maximum and minimum voltage parts of the multivalued electrical signal, and an intermediate amplitude signal has values obtained by multiplying the reference amplitude value (A) by the preset certain ratios. According to the present invention, the optimum control of the drive amplitude can be made also in such multi-level modulation. Therefore, it is possible to achieve the optimum control of an optical transceiver capable of freely changing the modulation method by a combination of an I/Q modulator and digital coherent reception.

Figure 6:
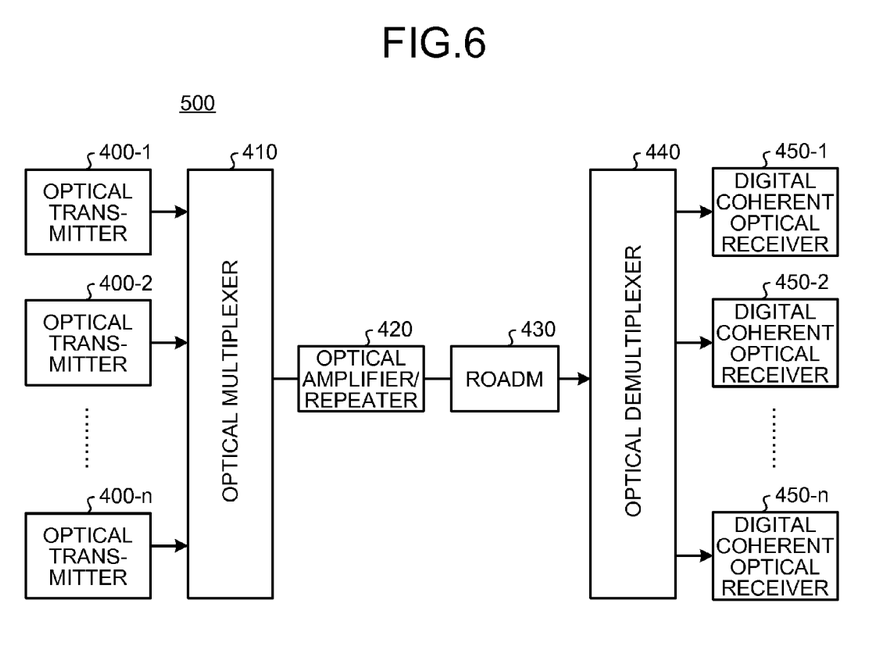
FIG. 6 is a block diagram illustrating a configuration of an optical transmission/reception system.

Subsequently, an optical transmission/reception system using the optical transmitter according to the first or second embodiment is explained. FIG. 6 is a block diagram illustrating a configuration of the optical transmission/reception system. As illustrated in FIG. 6, an optical transmission/reception system 500 includes optical transmitters 400-1 to 400-*n* (n is an integer equal to or greater than two), an optical multiplexer 410, an optical amplifier/repeater 420, and a reconfigurable optical add/drop multiplexer (ROADM) 430. Furthermore, the optical transmission/reception system 500 includes an optical demultiplexer 440 and digital coherent optical receivers 450-1 to 450-*n*.

The optical transmitter according to the first or second embodiment can be applied to the optical transmitters 400-1 to 400-*n*. The optical transmitters 400-1 to 400-*n* output modulated optical signals of different wavelengths (λ1 to λn), respectively.

The optical multiplexer 410 combines the modulated optical signals of different wavelengths output from the optical transmitters 400-1 to 400-*n* by wavelength multiplexing, and outputs a combined optical signal via, for example, a fiber-optic cable or the like. The optical amplifier/repeater 420 amplifies the combined optical signal to compensate the transmission loss of the combined optical signal output from the optical multiplexer 410.

The ROADM 430 performs a process of adding an optical signal of an arbitrary wavelength and a process of extracting an arbitrary wavelength from an optical signal. For example, the ROADM 430 extracts an arbitrary plurality of optical signals of different wavelengths from a combined optical signal output from the optical amplifier/repeater 420, and outputs the extracted optical signals to the optical demultiplexer 440.

The optical demultiplexer 440 separates the combined optical signal having a plurality of wavelengths output from the ROADM 430 into a plurality of modulated optical signals by wavelength. The optical demultiplexer 440 outputs the plurality of modulated optical signals by wavelength to the digital coherent optical receivers 450-1 to 450-*n*, respectively. The digital coherent optical receivers 450-1 to 450-*n* each receive the modulated optical signal of each wavelength output from the optical demultiplexer 440, and perform various reception processing, such as polarization division and QAM demodulation, and then transmit the processed modulated optical signal to, for example, a device that sorts a signal by route, such as a large-scale router. Incidentally, the digital coherent receiver has the wavelength select function, so the system can be configured to include no optical demultiplexer 440.

According to this optical transmission/reception system 500, in addition to polarization multiplexing and QAM demodulation by the optical transmitters 400-1 to 400-n, wavelength multiplexing is performed on a modulated optical signal, and then the modulated optical signal is transmitted/received; therefore, it is possible to achieve a high-capacity optical transmission/reception system. Furthermore, for example, by changing a multivalued degree of a multivalued electrical signal in the optical transmitters 400-1 to 400-n, a transmission capacity per wavelength can be changed without increasing a baud rate. Moreover, also when the transmission capacity is increased as a result of a change in the multivalued degree of the multivalued electrical signal, the baud rate is not increased, and therefore, the wavelength spectrum width is not broadened, and dense wavelength multiplexing can be performed without changing a multiplexing filter.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmitter comprising:
    a selection circuit that selects signal components on sides of maximum and minimum values in a multivalued electrical signal for modulation of a transmitting signal as a low-frequency superimposed part, the multivalued electrical signal having three or more values including the maximum and minimum values and an intermediate amplitude value;
    a signal processing circuit that generates a multivalued electrical signal from a combination of a superimposed signal obtained by superimposing a low-frequency wave on the low-frequency superimposed part and a signal having a plurality of intermediate amplitude values on which the low-frequency wave is not superimposed;
    an optical modulator that modulates a carrier light on the basis of the multivalued electrical signal generated by the signal processing circuit; and
    an amplitude control circuit that controls a reference amplitude value or amplitude of the multivalued electrical signal on the basis of low-frequency components contained in a modulated optical signal modulated by the optical modulator.

2. The optical transmitter according to claim 1, wherein the selection circuit selects only maximum and minimum voltage parts of the reference amplitude value as the low-frequency superimposed part.

3. The optical transmitter according to claim 2, wherein when the low-frequency wave is superimposed on the maximum and minimum voltage parts, the signal processing circuit superimposes low-frequency waves which are opposite in phase on the maximum and minimum voltage parts, respectively.

4. The optical transmitter according to claim 1, wherein the amplitude control circuit controls the reference amplitude value or the amplitude of the multivalued electrical signal such that intensity of the low-frequency components contained in the modulated optical signal gets lower.

5. The optical transmitter according to claim 1, wherein the optical modulator modulates the carrier light on the basis of the multivalued electrical signal using an optical quadrature amplitude modulation method or an optical amplitude multilevel modulation method.

6. The optical transmitter according to claim 1, further comprising a switching circuit that outputs a switching signal for switching a modulation method to the signal processing circuit, wherein
    the signal processing circuit is capable of variably setting a multivalued degree of the multivalued electrical signal in response to a switching signal output from the switching circuit.

7. The optical transmitter according to claim 1, wherein the intermediate amplitude values are obtained by multiplying a reference amplitude value by preset different ratios, respectively.

8. An optical transmission method comprising:
    selecting signal components on sides of maximum and minimum values in a multivalued electrical signal for modulation of a transmitting signal as a low-frequency superimposed part, the multivalued electrical signal having three or more values including the maximum and minimum values and an intermediate amplitude value;
    generating a multivalued electrical signal from a combination of a superimposed signal obtained by superimposing a low-frequency wave on the low-frequency superimposed part and a signal having a plurality of intermediate amplitude values on which the low-frequency wave is not superimposed;
    modulating a carrier light into an optical signal on the basis of the generated multivalued electrical signal; and
    controlling a reference amplitude value or amplitude of the multivalued electrical signal on the basis of low-frequency components contained in the modulated optical signal.

9. An optical transmission/reception system comprising:
    a plurality of optical transmitters that each include:
        a selection circuit that selects signal components on sides of maximum and minimum values in a multivalued electrical signal for modulation of a transmitting signal as a low-frequency superimposed part, the multivalued electrical signal having three or more values including the maximum and minimum values and an intermediate amplitude value;
        a signal processing circuit that generates a multivalued electrical signal from a combination of a superimposed signal obtained by superimposing a low-frequency wave on the low-frequency superimposed part and a signal having a plurality of intermediate amplitude values on which the low-frequency wave is not superimposed;
    an optical modulator that modulates a carrier light on the basis of the multivalued electrical signal generated by the signal processing circuit; and
    an amplitude control circuit that controls a reference amplitude value or amplitude of the multivalued electrical signal on the basis of low-frequency components contained in a modulated optical signal modulated by the optical modulator, the plurality of optical transmitters outputting the modulated optical signal of a different wavelength from one another;
    an optical multiplexer that combines a plurality of modulated optical signals of different wavelengths output from the plurality of optical transmitters, respectively;

an optical amplifier/repeater that includes an amplifier for amplifying a combined optical signal output from the optical multiplexer; and a plurality of optical receivers that receive an optical signal transmitted via the optical amplifier/repeater.

* * * * *

UNITED STATES PATENT AND TRADEMARK OFFICE
CERTIFICATE OF CORRECTION

PATENT NO. : 8,811,821 B2  
APPLICATION NO. : 13/585093  
DATED : August 19, 2014  
INVENTOR(S) : Hiroshi Nishimoto Page 1 of 1

It is certified that error appears in the above-identified patent and that said Letters Patent is hereby corrected as shown below:

On the Title Page, Item (54), and in the Specification, Column 1, Line 2 (Title), Delete "AND" and insert -- AND OPTICAL --, therefor.

Signed and Sealed this  
Eighteenth Day of November, 2014

Michelle K. Lee  
*Deputy Director of the United States Patent and Trademark Office*